United States Patent [19]
Wehunt et al.

[11] Patent Number: 5,896,550
[45] Date of Patent: Apr. 20, 1999

[54] DIRECT MEMORY ACCESS CONTROLLER WITH FULL READ/WRITE CAPABILITY

[75] Inventors: Omer Lem Wehunt, Phoenix, Ariz.; Jeffrey M. Lavin, Longmont, Colo.

[73] Assignee: VLSI Technology, Inc., San Jose, Calif.

[21] Appl. No.: 08/825,661

[22] Filed: Apr. 3, 1997

[51] Int. Cl.$^6$ .................. G06F 13/00; G06F 11/16
[52] U.S. Cl. .................. 395/846; 395/281; 395/325; 395/497.01; 395/823
[58] Field of Search .................. 395/842, 845, 395/843, 846, 281, 823, 325, 497.01; 711/100, 104, 105

[56] References Cited

U.S. PATENT DOCUMENTS

| | | | |
|---|---|---|---|
| 5,381,538 | 1/1995 | Amini et al. | 395/426 |
| 5,655,151 | 8/1997 | Bowes et al. | 395/842 |
| 5,764,995 | 6/1998 | DeRoo et al. | 395/726 |

OTHER PUBLICATIONS

Intel Peripheral Components Catalog 1991, ISBN#1-55512-127-6, Intel Corporation, Literature Sales, P.O. Box 7641, Mt. Prospect, IL 60056-7641, pp. 3-14—3-25.

*Primary Examiner*—Hassan Kizou
*Assistant Examiner*—Abu Hossain
*Attorney, Agent, or Firm*—Douglas L. Weller

[57] ABSTRACT

Versatility of access to a register set within a direct memory access (DMA) controller is increased. The DMA controller controls direct memory access transfers to and from a main memory. When a first control field in a configuration register has a first value, normal operating access is provided to a register set within the DMA controller. The register set provides control and status of the direct memory access transfers to and from the main memory. When the first control field in the configuration register has a second value special access is provided to the register set. The special access allows storage and restoration of a state of a DMA transfer.

20 Claims, 3 Drawing Sheets

DIRECT MEMORY ACCESS CONTROLLER WITH FULL READ/WRITE CAPABILITY

BACKGROUND

The present invention concerns personal computers and pertains particularly to a direct memory access controller with full read/write capability.

The standard personal computer (PC) architecture facilitates data movement between an input/output (I/O) device and system memory by providing a hardware mechanism entitled Direct Memory Access (DMA). This hardware method of data transfer allows data to be read from an I/O device and written to a designated location in memory, or read from a designated location in memory and written to an I/O device without involvement by a central processing unit (CPU). This functionality in the PC architecture is basically a legacy feature from a time when hardware controlled system data transfers were usually faster than the comparatively slower CPU transfers.

Software compatibility issues currently requires that DMA functionality be propagated in current PC system designs to ensure older software execution on current machines. In the PC architecture the DMA process is administered by three controller chips: two 8237 DMA controllers, and an associated 74LS612 page register chip. These chips are available, for example, from VLSI Technology, Inc., having a business address of 1109 McKay Drive, San Jose, Calif. 95131.

In an integrated device, such as an application specific integrated circuit (ASIC) or PC core logic device, the DMA controllers and page registers exist as functional blocks. The page registers do not affect the actual control of the DMA transfer but simply hold the address of the memory page to be accessed and drive this information onto the address bus when appropriate.

Working in concert the two DMA controllers provide eight DMA channels that can address up to 16 megabytes of memory. Channels zero through three are eight bit (1 byte) channels, and channels four through seven are 16 bit (2 byte) channels. Once configured by software, the DMA controller is free to move "blocks" of data as small as a single byte or as large 64 kilobytes, the largest number programmable in the word count register for each channel. Each data move is referred to as a "transfer" and each transfer consist of one or more data transfer cycles that may be either a single byte or two bytes in size (i.e., 8 bit or 16 bits), depending upon the DMA channel selected.

Each transfer is initiated by a device asserting a DREQ signal associated with a specific channel to request the DMA transfer for that channel. The DMA controller arbitrates for control of the system and places the CPU in a hold state, and then returns an acknowledge signal, DACK, to the requesting device. The DMA controller then executes the DMA transfer according to the configuration set in the associated registers for the specific channel. The eight channels are independent and are set up on a rotating priority scheme so that only one specific channel is transferring data at a time.

Each channel in the DMA controller can be set to one of three modes of data transfer: Single, Block and Demand mode. Single mode permits a single transfer from the requesting I/O device to or from the specified memory address. Block mode permits a block of data to be transferred of a size specified by a value programmed into the DMA controller. Demand mode is similar to Block mode except that the transfer may be started, stopped, and restarted by asserting and de-asserting the DREQ.

Each of the three modes can be divided further into a transfer type. The available transfer types are: Read transfer that moves data from memory to the I/O device by asserting MEMR# and IOW#; Write transfer that moves data from the I/O device to memory by asserting MEMW# and IOR#; and a Verify transfers which are "pseudo transfers" that function the same as the Read and Write, except that the memory and I/O command lines remain inactive. A fourth type of transfer, memory-to-memory, also exists.

Historically, DMA systems in the PC architectures have functioned under the assumption that DMA transactions will always be permitted to proceed to completion and that a need to interrupt a DMA cycle prior to completion did not truly exist. However, with the advent of power management strategies and the implementation of "suspend" or "sleep" mode states in computers, it is now desirable to facilitate an interruption to a DMA transaction prior to completion. Such a situation presents a problem for a DMA architecture using DMA controllers as currently implemented. That is, currently, DMA controllers are not designed to permit such an interruption nor to facilitate restoration of system conditions to permit completion of an interrupted DMA cycle.

SUMMARY OF THE INVENTION

In accordance with the preferred embodiment of the present invention, versatility of access to a register set within a direct memory access (DMA) controller is increased. The DMA controller controls direct memory access transfers to and from a main memory. When a first control field in a configuration register has a first value, normal operating access is provided to a register set within the DMA controller. The register set provides control and status of the direct memory access transfers to and from the main memory. When the first control field in the configuration register has a second value special access is provided to the register set. The special access allows storage and restoration of a state of a DMA transfer.

For example, the register set includes a base address register, a current address register, a base word count register and a current word count register. The base address register in a normal operating access is write only accessible. The current address register in the normal operating access is read accessible, and is write accessible when written to simultaneously with a write to the base address register. The base word count register in the normal operating access is write only accessible. The current word count register in the normal operating access is read accessible, and is write accessible when written to simultaneously with a write to the base word count register.

The direct memory access controller may include additional registers. For example, a status register in a normal operating access is read only accessible. A command register in the normal operating access is write only accessible. A request register in the normal operating access is write only accessible.

For example, in one embodiment of the present invention, special access is allowed by providing access to each register in the register set through placing a predetermined index into an address register and performing a transfer of data to/from a data values register. In this embodiment, when special access is enabled, read and write access are available to the base address register, the current address register, the base word count register and the current word count register by placing an associated index into the address register and performing a transfer of data to the data values register.

In an alternative embodiment of the present invention, special access to each register in the set of registers is an inverted operating access. In the inverted access, registers that for normal operating access are read only become write only. In the inverted access, registers that for normal operating access are write only become read only. In the inverted access, registers that for normal operating access are both read and write accessible remain read and write accessible. Registers that for normal operating access are writeable only when linked with a write to another register become in inverted operating access writeable independent of any other register.

In the alternative embodiment of the present invention, when inverted access is enabled, the base address register is read only accessible, the current address register is write accessible when written to independent of a write to the base address register, the base word count register is read only accessible, and the current word count register is write accessible, when written to independent of a write to the base word count register.

The present invention facilitates an interruption to a DMA transaction prior to completion and allows restoration of system conditions to permit completion of the interrupted DMA cycle.

DESCRIPTION OF THE PREFERRED EMBODIMENT

Figure 1:
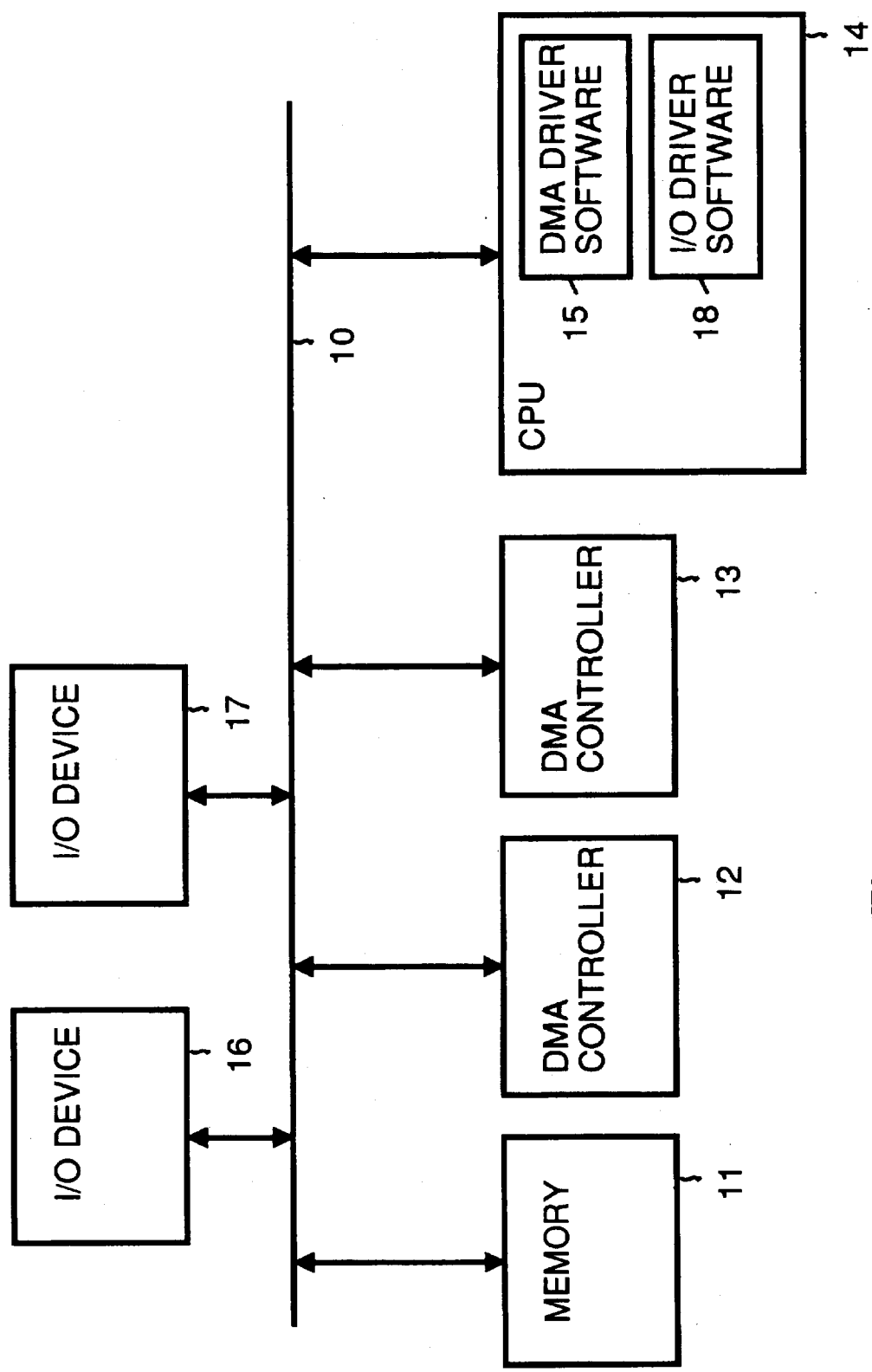
FIG. 1 shows a simplified block diagram of a computer system which includes DMA controllers.

FIG. 1 shows a simplified block diagram of a computer system. The computer system includes a bus 10, a main memory 11, a DMA controller 12, a DMA controller 13, a central processing unit (CPU) 14, an I/O device 16 and an I/O device 17. For example, the computer system is a PC architecture.

DMA driver software 15, when running on CPU 14 programs all pertinent registers in the DMA controller 12 or DMA controller 13 before a transfer takes place on a specific DMA channel (CH). This is accomplished by performing I/O writes to specific configuration and status register addresses in the computer system address space for the DMA controllers. I/O driver software 18, when running on CPU 14 programs all pertinent registers in the DMA controller 12 or DMA controller 13 before a transfer takes place on a specific DMA channel.

The progress of each transfer is controlled and monitored in a set of configuration and status registers in each of DMA controllers 12 and 13. Typically, DMA transfers are between an I/O device and memory 11.

Prior to the request, I/O driver software 18, associated with a particular I/O device, preprograms DMA channel registers to stage the expected DMA transfer.

Figure 2:
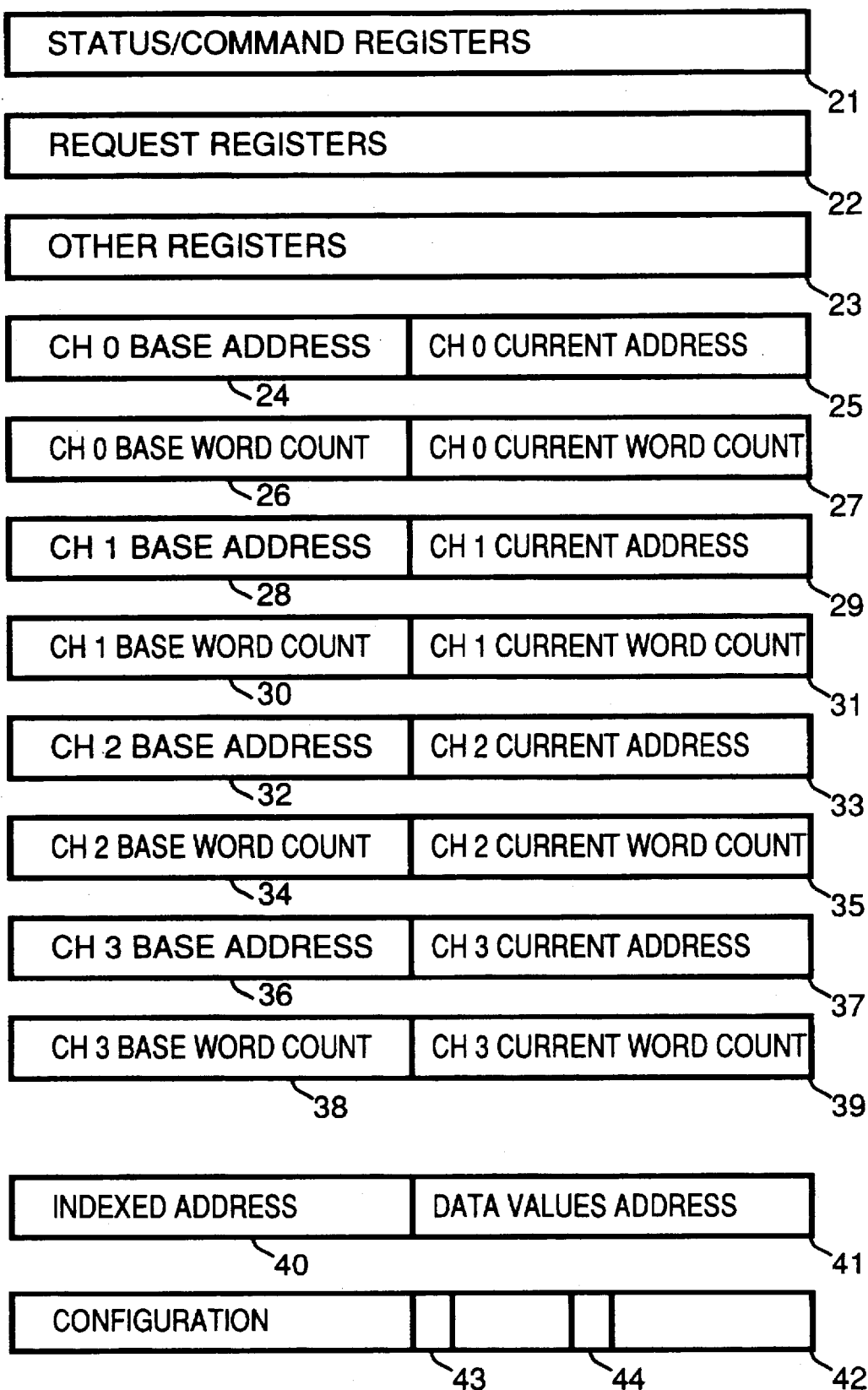
FIG. 2 shows a registers used to control a DMA controller in accordance with a preferred embodiment of the present invention.

FIG. 2 is a block diagram which shows the registers for DMA controller 12. Status/command registers 21 contain channel request status and a "Terminal Count" (TC) signal. The TC signal, when asserted, indicates that all transfers have occurred. In the standard PC/AT access mode, the status register within status command registers 21 allows for a destructive read only. That is, the contents of the status register is lost when status register is read. In the standard PC/AT access mode, writes to the status register are not possible.

Request registers 22 are used to request a DMA transfer. In the standard PC/AT access mode, reads to these registers are not possible. Other registers 23 include, for example, mode, mask and temporary registers.

For each of four channels there is a base address register, a current address register, a base word count register and a current word count register. For example, for a channel (CH) 0, DMA controller 12 includes a channel 0 base address register 24, a channel 0 current address register 25, a channel 0 base word count register 26, and a channel 0 current word count register 27. For a channel 1, DMA controller 12 includes a channel 1 base address register 28, a channel 1 current address register 29, a channel 1 base word count register 30, and a channel 1 current word count register 31. For a channel 2, DMA controller 12 includes a channel 2 base address register 32, a channel 2 current address register 33, a channel 2 base word count register 34, and a channel 2 current word count register 35. For a channel 3, DMA controller 12 includes a channel 3 base address register 36, a channel 3 current address register 37, a channel 3 base word count register 38, and a channel 3 current word count register 39.

The base address register for each channel contains the memory address where the data is to be written to or read from. The base word count register for each channel contains the number of transfers to be made. The current address register for each channel increments or decrements with each transfer from the beginning base address. The current word count register for each channel decrements with each transfer. This register generates the "TC" signal when rollover from 0 to FFFFh occurs. TC indicates that all transfers have occurred, and is placed in status/command registers 21.

In the standard PC/AT access mode, base and current registers cannot be written separately. Also in the standard PC/AT access mode, base registers cannot be read.

Through a specific bit in the request registers 22, a DMA transfer can be requested by software running on CPU 14. However DMA transfers are typically hardware requested by the I/O device in response to a "need" to transfer data to or from memory 11. The following is the process of a typical DMA transfer between I/O device 16 and memory 11 using DMA controller 12.

The request is initiated by I/O device 16 asserting the DREQ signal. Prior to the request, DMA software driver 15 set up the channel to accommodate the transfer by preprogramming the base address, base word count and other associated registers. Values written into the base address and base word count registers are simultaneously written into the current address and current word count registers when the transfer is initialized. The current word register is decremented with each data transfer. However, the current address register may be either incremented or decremented depending upon the mode selected in a configuration register 42 for DMA controller 12.

DMA controller 12 then halts CPU 14 and assumes mastership of bus 10. This is done by asserting the HOLD signal to CPU 14 and waiting for an acknowledging HLDA signal indicating CPU 14 has finished all current cycles and is tri-stating bus 10.

In the case of a DMA write cycle, by driving the system control strobes and address and data bus signals as needed, DMA controller 12 reads the data from I/O device 16 and writes the data to system memory 11. In the case of a DMA read cycle, DMA controller 12 reads the data from memory 11 and writes the data to I/O device 16, again driving bus 10 as needed to transfer the data. These are typically known as "fly-by" DMA cycles in that the I/O and memory cycles are more or less simultaneous on bus 10 and the data is transferred "on the fly."

In either case the transfer begins from the memory address contained in the appropriate (i.e. channel 0, 1, 2 or 3) base address register of DMA controller 12. The length of the transaction is contained in the appropriate base word count register of DMA controller 12. As the transaction progresses the status is reflected in the appropriate status, current address register and current word count register of DMA controller 12.

Transfer is continued until the current word register reaches zero. This causes a TC signal in DMA controller 12 status register to be asserted. In Single mode, TC is asserted after just a one byte or one word transfer. In Block or Demand mode, TC is asserted when the number of bytes or words programmed into the base word count register have been transferred. This is an indication to the software driver that the transfer has completed.

If "Autoinitialize" mode has been selected, the values entered into the base registers are automatically rewritten into the current registers to prepare the controller for the next transfer. If Autoinitialize mode is not selected, the current registers must be programmed by DMA driver software 15 prior to the next transfer.

In the case of a Demand mode transfer, data transfer may be stopped by I/O device 16 de-asserting the DREQ signal before the assertion of the TC signal. This causes DMA controller 12 to complete the byte or word transfer in progress, then release system control to CPU 14 by deasserting the HOLD. Other computer system activity may then proceed as normal.

When ready, I/O device 16 may resume the transfer by re-asserting the DREQ. This causes DMA controller 12 to continue the transfer from the point of interruption. The values in the current word count and current address registers are preserved during the interruption as long as the system remains powered and software does not re-program the base registers.

During any DMA transfer, CPU 14 is placed in a hold state and is released from this state when the transfer is complete. In the case of Demand mode DMA transfers, CPU 14 is also released from hold if the transfer is halted by the requesting I/O device. Within such an interruption, since CPU 14 is no longer in hold, other system events can occur that may subsequently prevent the completion of the entire Demand mode transfer. Such an event could be a button press from the user, a system condition that would invoke a power saving mode (known as "suspend"), or an indication from a battery management integrated circuit that would shut down the entire system until battery power was restored.

If appropriate conditions exist during such a system event, system management software run by CPU 14 may elect to turn off system power or selectively power down specific devices in the system. In a laptop computer such power cycling is known "0 Volt Suspend" or also "suspend to disk". In the case of a 0 Volt Suspend, through the use of system "shadow" registers, the system status is read and stored, usually on a system hard drive (e.g., I/O device 17) before the power is removed. This stored status is checked the next time the system is powered-on to restore the state of the system.

In such a situation, if a demand mode transfer has been stopped before completion, the status register and base and current register pairs that track the transfer contain different values. If the power to DMA controller 12 has been removed while the transfer has been interrupted, these register values are lost. To complete the interrupted Demand mode transfer, this status must be restored to DMA controller 12. A complication to this situation is that it is also possible that another lower priority device may have also requested a DMA transfer. This would have been indicated by the appropriate bit in DMA controller 12 status register. Therefore the status register contents must also be restored after a loss of power.

As discussed above, in the standard PC/AT access mode, reads to status/command registers 21 are destructive resulting in lost data. Further, request registers 22 allow only write access. The current word count and current address registers can only be programmed by writing to the base word count and base address registers. Thus in the standard PC/AT access mode it is not possible to restore the required information in the register set to re-start an interrupted demand mode transfer. Upon coming out of the 0 Volt Suspend mode, an I/O device that requested an interrupted transfer would never finish. This could result in a system failure.

For example, when viewing a multimedia audio/video application such as a music video or soon to be released Digital Versatile Disks (DVD) video, if, during an audio DMA transfer, the application were suspended for either a power management reason or by choice of the user, when resumed the audio would need to restart exactly where the suspended event occurred. This would require that the DMA transfer in process would continue flawlessly. Otherwise synchronization between the video and audio would be compromised.

In accordance with the present invention, alternative access to DMA controller registers, in addition to that available in the standard PC/AT access mode, is implemented. The additional access allows for recovery from an interrupt during a DMA cycle.

Specifically, when a DMA cycle is interrupted and status information regarding the cycle is lost due to power failure or deliberate power cycling, restoring the interrupted DMA cycle is not possible using only the standard PC/AT access mode. The added mode allows CPU 14 to read and write the previously unreadable and unwriteable DMA controller registers. This permits CPU 14 to interrogate and reprogram DMA controller registers as needed to either prepare for a system suspend or to reinstate a specific system mode of operation.

However just changing the capabilities of the existing registers exposes numerous software legacy issues. Making existing registers that were previously read-only suddenly writeable could have serious consequences on system/ software integrity. Such registers could be exposed to poorly written software as well as innocent or malicious tampering.

The present invention guards against this. For example, in one preferred embodiment of the present invention, an alternate I/O address is provided to each of DMA controller registers that will respond to either an indexed addressing scheme, an unlock bit, or both.

This allows CPU 14 to use the alternate access to collect the status of DMA controller 12 prior to a suspend event, and to restore the exact status upon resuming operation of the computing system. This permits any interrupted DMA transfer to complete. Also, the ability to write previously un-writeable registers also lends versatility to DMA transfer software. Since two DMA controllers are used in a typical PC architecture system, the suggested index scheme makes allowances for this.

As discussed above, the standard PC/AT architecture uses two DMA controllers to provide eight DMA channels. DMA controller 12 provides the lower four channels (0–3) and is referred to as the "Primary" DMA controller. DMA controller 13 provides the upper four channels (4–7) and is referred to as the "Secondary" DMA controller.

For security purposes it is necessary to add configuration bits for each DMA controller to provide lock/unlock capability, and a bit to enable access to either the primary or secondary DMA controller. For example, in FIG. 2, two additional bits are shown added to configuration register 42 for DMA controller 12.

A DMA access lock bit 43 (DMA_ACC_LK), when set, enables access to DMA controller 12 configuration and status registers via an indexed address register 40 and a data values register 41. Indexed address register 40 and data values register 41 are together referred to as an indexed addressing address pair. Indexed address register 40 and data values register 41 are arbitrary address registers which are assigned any specific unused address during actual device/ system design. When using this pair of registers, the indexed address is written to indexed address register 40. Data values are written or read from address data values register 41. Clearing DMA access lock bit 43 disables access to DMA controller 12 configuration and status registers via indexed address register 40 and data values register 41.

A DMA primary/secondary bit 44 (DMA_PRI/SEC) selects which of the two DMA controllers is enabled to receive the accesses using indexed address register 40 and data values register 41. When set to 0, DMA controller 12 (the primary DMA controller), which carries channel 0–3, responds to the addresses 00–19 for indexed address register 40 and data values register 41. When DMA primary/ secondary bit 44 is set to 1, DMA controller 13 (the secondary DMA controller) which carries channels 4–7, responds to the addresses 00–19 for indexed address register 40 and data values register 41.

While shown located in configuration register 42, DMA access lock bit 43 and DMA primary/secondary bit 44 can exist in any device configuration register space available in DMA controller 12. An alternative to using DMA primary/ secondary bit 44 is to provide a second indexed addressing address pair which is specific to the secondary DMA controller in the system.

Since the original address map of the DMA system is unchanged, legacy software perceives no disruption in functionality. The new functions impact only new systems designed with the modified DMA controllers. Using this address mapping system values may be restored to any DMA controller register via indexed address register 40 and data values register 41.

Table 1 below describes the register set for DMA controller 12 (the primary DMA controller). "PC system address" is the address used to access each register in the standard PC/AT access mode. "Normal system access" refers to the access provided to each register in the standard PC/AT access mode. In this column, "write*" indicates that a write to a current address register for a particular channel can only be done simultaneously with a write to the base address register for the particular channel or that a write to a current word count register for a particular channel can only be done simultaneously with a write to the base word count register for the particular channel. "Register function", identifies the register of DMA controller 12 to which the entry pertains. "Indexed address" is the address placed in indexed address register 40 in order to access the register (provided DMA access lock bit 43 is set to and DMA primary/secondary bit 44 is set to 0). "Indexed Function" is the access allowed to the register of DMA controller 12 to which the entry pertains when accessed utilizing data values register 41 (provided DMA access lock bit 43 is set to and DMA primary/secondary bit 44 is set to 0).

TABLE 1

| PC System Address | Normal System Access | Register Function | Indexed Address | Indexed Function |
|---|---|---|---|---|
| 00 | write only | CH 0 base address register | 00 | read/write |
| 00 | read/write* | CH 0 current address register | 01 | read/write |
| 01 | write only | CH 0 base word count register | 02 | read/write |
| 01 | read/write* | CH 0 current word count register | 03 | read/write |
| 02 | write only | CH 1 base address register | 04 | read/write |
| 02 | read/write* | CH 1 current address register | 05 | read/write |
| 03 | write only | CH 1 base word count register | 06 | read/write |
| 03 | read/write* | CH 2 current word count register | 07 | read/write |
| 04 | write only | CH 2 base address register | 08 | read/write |
| 04 | read/write* | CH 2 current address register | 09 | read/write |
| 05 | write only | CH 2 base word count register | 0A | read/write |
| 05 | read/write* | CH 2 current word count register | 0B | read/write |
| 06 | write only | CH 3 base address register | 0C | read/write |
| 06 | read/write* | CH 3 current address register | 0D | read/write |
| 07 | write only | CH 3 base word count register | 0E | read/write |
| 07 | read/write* | CH 3 current word count register | 0F | read/write |
| 08 | read only | status register | 10 | read/write |
| 08 | write only | command register | 11 | read/write |
| 09 | write only | request register | 12 | read/write |
| 0A | write only | single mask register bit | 13 | read/write |
| 0B | write only | mode register | 14 | read/write |
| 0C | write only | clear byte pointer flip-flop | 15 | read/write |
| 0D | read only | temporary register | 16 | read/write |
| 0D | write only | master clear | 17 | N/A |
| 0E | write only | clear mask register | 18 | N/A |
| 0F | write only | write all mask register bits | 19 | read/write |

Table 2 below describes the register set for DMA controller 13 (the secondary DMA controller). "PC system address" is the address used to access each register in the standard PC/AT access mode. "Normal system access" refers to the access provided to each register in the standard PC/AT access mode. In this column, "write*" indicates that a write to a current address register for a particular channel can only be done simultaneously with a write to the base address register for the particular channel or that a write to a current word count register for a particular channel can only be done simultaneously with a write to the base word count register for the particular channel. "Register function", identifies the register of DMA controller 13 to which the entry pertains. "Indexed address" is the address placed in the indexed address register in order to access the register (provided DMA access lock bit 43 is set to 1 and DMA primary/secondary bit 44 is set to 1). "Indexed Function" is the access allowed to the register of DMA controller 13 to which the entry pertains when accessed utilizing data values register (provided DMA access lock bit 43 is set to 1 and DMA primary/secondary bit 44 is set to 1).

TABLE 2

| PC System Address | Normal System Access | Register Function | Indexed Address | Indexed Function |
|---|---|---|---|---|
| C0 | write only | CH 4 base address register | 00 | read/write |
| C0 | read/write* | CH 4 current address register | 01 | read/write |
| C2 | write only | CH 4 base word count register | 02 | read/write |
| C2 | read/write* | CH 4 current word count register | 03 | read/write |
| C4 | write only | CH 5 base address register | 04 | read/write |
| C4 | read/write* | CH 5 current address register | 05 | read/write |
| C6 | write only | CH 5 base word count register | 06 | read/write |
| C6 | read/write* | CH 5 current word count register | 07 | read/write |
| C8 | write only | CH 6 base address register | 08 | read/write |
| C8 | read/write* | CH 6 current address register | 09 | read/write |
| CA | write only | CH 6 base word count register | 0A | read/write |
| CA | read/write* | CH 6 current word count register | 0B | read/write |
| CC | write only | CH 7 base address register | 0C | read/write |
| CC | read/write* | CH 7 current address register | 0D | read/write |
| CE | write only | CH 7 base word count register | 0E | read/write |
| CE | read/write* | CH 7 current word count register | 0F | read/write |
| D0 | read only | status register | 10 | read/write |
| D0 | write only | command register | 11 | read/write |
| D2 | write only | request register | 12 | read/write |
| D4 | write only | single mask register bit | 13 | read/write |
| D6 | write only | mode register | 14 | read/write |
| D8 | write only | clear byte pointer flip-flop | 15 | read/write |
| DA | read only | temporary register | 16 | read/write |
| DA | write only | master clear | 17 | N/A |
| DC | write only | clear mask register | 18 | N/A |
| DE | write only | write all mask register bits | 19 | read/write |

For computer system which use a Peripheral Component Interconnect (PCI) bus architectures that must also have DMA functionality, an alternative preferred embodiment of the present invention is used. This is illustrated by FIG. 3.

Figure 3:
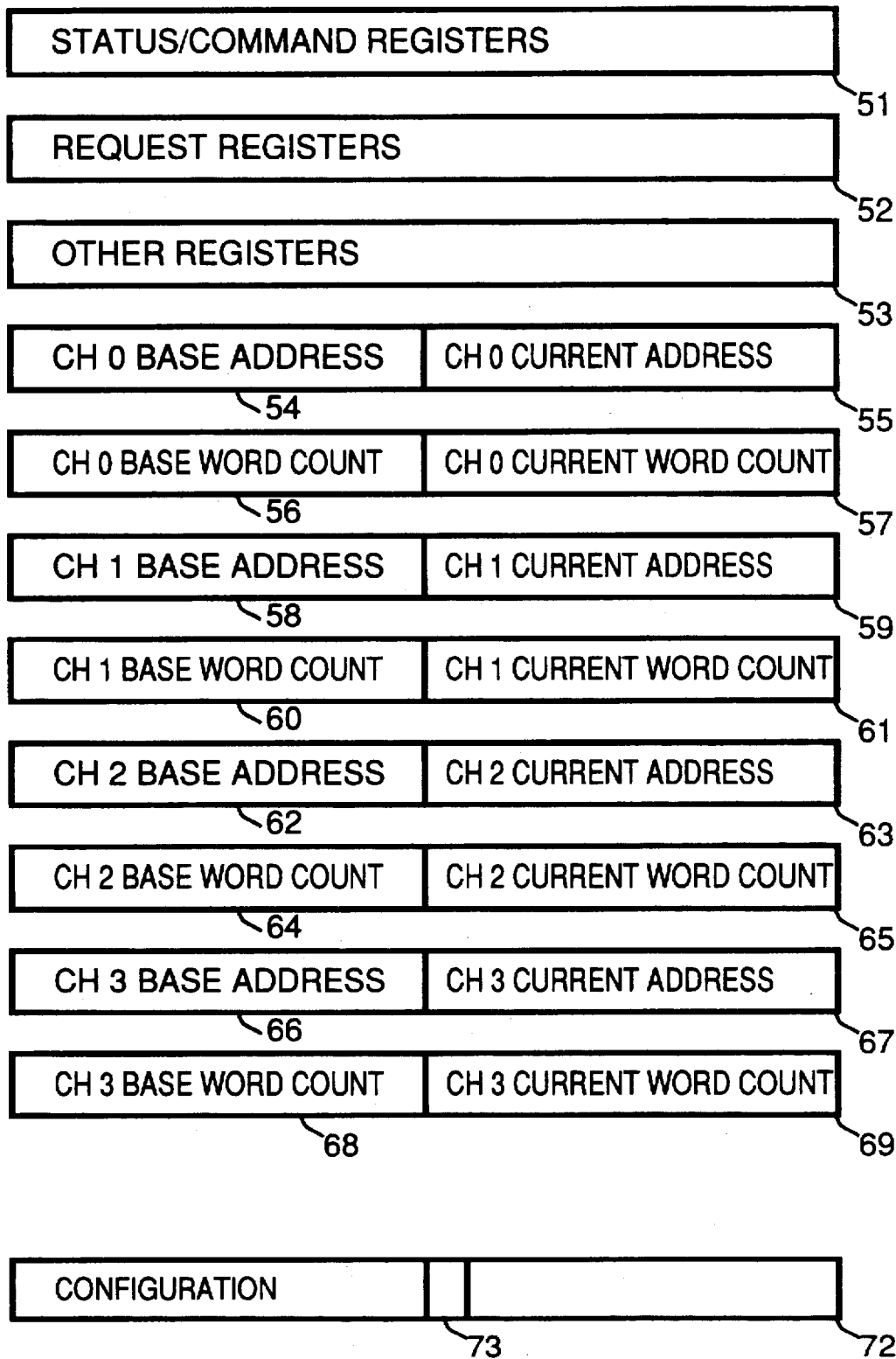
FIG. 3 shows a registers used to control a DMA controller in accordance with an alternative preferred embodiment of the present invention.

In FIG. 3, status/command registers 51 contain channel request status and a "TC" signal. The TC signal, when asserted, indicates that all transfers have occurred. In the standard PCI access mode, status command registers 51 allow for a destructive read only. That is, the contents of status/command registers 51 are lost when status command registers 51 are read. In the standard PCI access mode, writes are not possible.

Request registers 52 are used to request a DMA transfer. In the standard PCI access mode, reads are not possible. Other registers 53 include, for example, mode, mask and temporary registers.

For each of four channels there is a base address register, a current address register, a base word count register and a current word count register. For example, for a channel (CH) 0, DMA controller 12 includes a channel 0 base address register 54, a channel 0 current address register 55, a channel 0 base word count register 56, and a channel 0 current word count register 57. For a channel 1, DMA controller 12 includes a channel 1 base address register 58, a channel 1 current address register 59, a channel 1 base word count register 60, and a channel 1 current word count register 61. For a channel 2, DMA controller 12 includes a channel 2 base address register 62, a channel 2 current address register 63, a channel 2 base word count register 64, and a channel 2 current word count register 65. For a channel 3, DMA controller 12 includes a channel 3 base address register 66, a channel 3 current address register 67, a channel 3 base word count register 68, and a channel 3 current word count register 69.

A PCI bus architecture allocates configuration registers that provide space for device specific functions. The target device (e.g. DMA controller 12) with a single control bit 73 in a PCI configuration register 72, remaps the read/write functionality of each DMA controller register. Thus by re-using DMA controller 12 register I/O space, the problem of saving and re-instating operational modes of the DMA Controller is solved.

Setting control bit 73 of PCI configuration register 72 places the DMA controller register set in an "Alternate Access" mode. In alternate access mode, the write or read function of each register in DMA controller 12 is inverted to permit an alternate mode accesses to each register. Registers that previously were read only become write only. Write only registers become read only. Read/write registers retain read/write access. The "write" link between the base and current DMA controller registers is disabled, allowing the base and current registers to be written independently. This enables interrogation and reprogramming of all DMA controller registers to reinstate any mode of operation.

In the preferred embodiment, control bit 73 is referred to as "ALT_DMA_ACC" for alternate DMA Access. The PCI configuration space provides inherent security since it is accessed only by PCI configuration cycles. This method additionally preserves general system I/O address space and decode logic since the I/O address space is already reserved for DMA controller 12 and further address decode logic is not required.

Table 3 below describes the register set for DMA controller 12 (the primary DMA controller). "PC system address" is the address used to access each register in the standard PCI access mode. "Normal system access" refers to the access provided to each register in the standard PCI access mode. In this column, "write*" indicates that a write to a current address register for a particular channel can only be done simultaneously with a write to the base address register for the particular channel or that a write to a current word count register for a particular channel can only be done simultaneously with a write to the base word count register for the particular channel. "Register function", identifies the register of DMA controller 12 to which the entry pertains. "Alternate Function" is the access allowed to the register of DMA controller 12 to which the entry pertains when control bit 73 in configuration register 72 is set to 1.

TABLE 3

| PC System Address | Normal System Access | Register Function | Alternate Function |
|---|---|---|---|
| 00 | write only | CH 0 base address register | read independently |
| 00 | read/write* | CH 0 current address register | write independently |
| 00 | write only | CH 0 base word count register | read independently |
| 01 | read/write* | CH 0 current word count register | write independently |

TABLE 3-continued

| PC System Address | Normal System Access | Register Function | Alternate Function |
|---|---|---|---|
| 02 | write only | CH 1 base address register | read independently |
| 02 | read/write* | CH 1 current address register | write independently |
| 03 | write only | CH 1 base word count register | read independently |
| 03 | read/write* | CH 1 current word count register | write independently |
| 04 | write only | CH 2 base address register | read independently |
| 04 | read/write* | CH 2 current address register | write independently |
| 05 | write only | CH 2 base word count register | read independently |
| 05 | read/write* | CH 2 current word count register | write independently |
| 06 | write only | CH 3 base address register | read independently |
| 06 | read/write* | CH 3 current address register | write independently |
| 07 | write only | CH 3 base word count register | read independently |
| 07 | read/write* | CH 3 current word count register | write independently |
| 08 | read only | status register | write independently |
| 08 | write only | command register | read independently |
| 09 | write only | request register | read independently |
| 0A | write only | single mask register bit | read independently |
| 0B | write only | mode register | read independently |
| 0C | write only | clear byte pointer flip-flop | read independently |
| 0D | write only | temporary register | write independently |
| 0D | write only | master clear | read independently |
| 0E | write only | clear mask register | read independently |
| 0F | write only | write all mask register bits | read independently |

Table 4 below describes the register set for DMA controller 13 (the secondary DMA controller). "PC system address" is the address used to access each register in the standard PCI access mode. "Normal system access" refers to the access provided to each register in the standard PCI access mode. In this column, "write*" indicates that a write to a current address register for a particular channel can only be done simultaneously with a write to the base address register for the particular channel or that a write to a current word count register for a particular channel can only be done simultaneously with a write to the base word count register for the particular channel. "Register function", identifies the register of DMA controller 13 to which the entry pertains. "Alternate Function" is the access allowed to the register of DMA controller 13 to which the entry pertains when control bit 73 in configuration register 72 is set to 1.

TABLE 4

| PC System Address | Normal System Access | Register Function | Alternate Function |
|---|---|---|---|
| C0 | write only | CH 4 base address register | read independently |
| C0 | read/write* | CH 4 current address register | write independently |
| C2 | write only | CH 4 base word count register | read independently |
| C2 | read/write* | CH 4 current word count register | write independently |
| C4 | write only | CH 5 base address register | read independently |
| C4 | read/write | CH 5 current address register | write independently |
| C6 | write only | CH 5 base word count register | read independently |
| C6 | read/write | CH 5 current word count register | write independently |
| C8 | write only | CH 6 base address register | read independently |
| C8 | read/write* | CH 6 current address register | write independently |
| CA | write only | CH 6 base word count register | read independently |
| CA | read/write* | CH 6 current word count register | write independently |
| CC | write only | CH 7 base address register | read independently |
| CC | read/write* | CH 7 current address register | write independently |
| CE | write only | CH 7 base word count register | read independently |
| CE | read/write* | CH 7 current word count register | write independently |
| D0 | read only | status register | write independently |
| D0 | write only | command register | read independently |
| D2 | write only | request register | read independently |
| D4 | write only | single mask register bit | read independently |
| D6 | write only | mode register | read independently |
| D8 | write only | clear byte pointer flip-flop | read independently |
| DA | read only | temporary register | write independently |
| DA | write only | master clear | read independently |
| DC | write only | clear mask register | read independently |
| DE | write only | write all mask register bits | read independently |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for increasing versatility of access to a register set within a direct memory access (DMA) controller, the DMA controller controlling direct memory access transfers to and from a main memory, the method comprising the following steps:

(a) when a first control field in a configuration register has a first value, providing normal operating access to a register set within the DMA controller, wherein the normal operating access includes the register set providing control and status of the direct memory access transfers to and from the main memory, the normal operating access not allowing storage and restoration of a state of a DMA transfer; and, (b) when the first control field in the configuration register has a second value, providing special access to the register set, the special access allowing storage and restoration of a state of a DMA transfer.

2. A method as in claim 1 wherein step (b) includes:

providing access to each register in the register set through placing a predetermined index into an address register and performing a transfer of data to/from a data values register.

3. A method as in claim 1 wherein in step (b) access to each register in the set of registers is an inverted operating access, wherein for registers in the set of register:

registers that for normal operating access are read only become in inverted operating access write only;

registers that for normal operating access are write only become in inverted operating access read only;

registers that for normal operating access are both read and write accessible remain in inverted operating access read and write accessible; and, registers that for normal operating access are writeable only when linked with a write to another register become in inverted operating access writeable independent of any other register.

4. A method as in claim 1 wherein step (a) includes:

providing write only access to a base address register;

providing read access and providing write access to a current address register wherein write access is permitted to the current address register only when written to simultaneously with a write to the base address register;

providing write only access to a base word count register; and, providing read access and providing write access to a current word count register wherein write access is permitted to the current word count register only when written to simultaneously with a write to the base word count register.

5. A method as in claim 4 wherein in step (b) includes:

providing access to the base address register, the current address register, the base word count register and the current word count register through placing an associated index into an address register and performing a transfer of data to/from a data values register.

6. A method as in claim 4 wherein in step (b) access to each register in the set of registers is an inverted operating access, so that step (b) includes:

providing read only access to the base address register;

providing write access to the current address register independent of a write to the base address register;

providing read only access to the base word count register; and, providing write access to the current word count register independent of a write to the base word count register.

7. A computing system comprising:

a bus;

a main memory coupled to the bus;

a central processing unit, coupled to the bus; and, a direct memory access (DMA) controller, coupled to the bus, the DMA controller controlling direct memory access transfers to and from the main memory, the DMA controller including:

a register set for providing control and status of the direct memory access transfers to and from the main memory, limited access being provided to registers within the register set, and a configuration register having a first control field, wherein access provided to registers within the register set changes based on a value placed in the first control field.

8. A computing system as in claim 7 wherein the direct memory access controller additionally comprises:

an address register; and, a data values register;

wherein when the first control field is at a first value, each register in the register set is available by placing a predetermined index into the address register and performing a transfer of data to/from the data values register.

9. A computing system as in claim 7 wherein when the first control field is at a first value, access to each register in a register set is a normal operating access, and wherein when the first control field is at a second value, access to each register in a register set is an inverted operating access, wherein:

registers that for normal operating access are read only become in inverted operating access write only;

registers that for normal operating access are write only become in inverted operating access read only;

registers that for normal operating access are both read and write accessible remain in inverted operating access read and write accessible; and registers that for normal operating access are writeable only when linked with a write to another register become in inverted operating access writeable independent of any other register.

10. A computing system as in claim 7 wherein the register set includes:

a base address register which in a normal operating access is write only accessible;

a current address register which in the normal operating access is read accessible, and is write accessible when written to simultaneously with a write to the base address register;

a base word count register which in the normal operating access is write only accessible; and, a current word count register which in the normal operating access is read accessible, and is write accessible when written to simultaneously with a write to the base word count register.

11. A computing system as in claim 10, wherein the direct memory access controller additionally comprises:

an address register; and, a data values register;

wherein when the first control field is at a first value, read and write access are available to the base address register, the current address register, the base word count register and the current word count register by placing an associated index into the address register and performing a transfer of data to the data values register.

12. A computing system as in claim 10 wherein when the first control field is at a first value, access to each register in a register set is a normal operating access, and wherein when the first control field is at a second value, access to each register in a register set is an inverted operating access, wherein for the inverted operating access:

the base address register is read only accessible;

the current address register is write accessible when written to independent of a write to the base address register;

the base word count register is read only accessible; and, the current word count register is write accessible, when written to independent of a write to the base word count register.

13. A computing system as in claim 10 wherein the register set additionally includes:

a status register which in a normal operating access is read only accessible;

a command register which in the normal operating access is write only accessible; and, a request register which in the normal operating access is write only accessible.

14. A direct memory access (DMA) controller, the DMA controller controlling direct memory access transfers to and from a main memory, the DMA controller comprising:

a register set for providing control and status of the direct memory access transfers to and from the main memory, limited access being provided to registers within the register set; and, a configuration register having a first control field, wherein access provided to registers within the register set changes based on a value placed in the first control field.

15. A direct memory access controller as in claim 14 additionally comprising:

an address register; and, a data values register;

wherein when the first control field is at a first value, each register in the register set is available by placing a predetermined index into the address register and performing a transfer of data to/from the data values register.

16. A direct memory access controller as in claim 14 wherein when the first control field is at a first value, access to each register in a register set is a normal operating access, and wherein when the first control field is at a second value, access to each register in a register set is an inverted operating access, wherein:

registers that for normal operating access are read only become in inverted operating access write only;

registers that for normal operating access are write only become in inverted operating access read only;

registers that for normal operating access are both read and write accessible remain in inverted operating access read and write accessible; and, registers that for normal operating access are writeable only when linked with a write to another register become in inverted operating access writeable independent of any other register.

17. A direct memory access controller as in claim 14 wherein the register set includes:

a base address register which in a normal operating access is write only accessible;

a current address register which in the normal operating access is read accessible, and is write accessible when written to simultaneously with a write to the base address register;

a base word count register which in the normal operating access is write only accessible; and, a current word count register which in the normal operating access is read accessible, and is write accessible when written to simultaneously with a write to the base word count register.

18. A direct memory access controller as in claim 17 additionally comprising:

an address register; and, a data values register;

wherein when the first control field is at a first value, read and write access are available to the base address register, the current address register, the base word count register and the current word count register by placing an associated index into the address register and performing a transfer of data to the data values register.

19. A direct memory access controller as in claim 17 wherein when the first control field is at a first value, access to each register in a register set is a normal operating access, and wherein when the first control field is at a second value, access to each register in a register set is an inverted operating access, wherein for the inverted operating access:

the base address register is read only accessible;

the current address register is write accessible when written to independent of a write to the base address register;

the base word count register is read only accessible; and, the current word count register is write accessible, when written to independent of a write to the base word count register.

20. A direct memory access controller as in claim 17 wherein the register set includes:

a status register which in a normal operating access is read only accessible;

a command register which in the normal operating access is write only accessible; and, a request register which in the normal operating access is write only accessible.

* * * * *